US012526041B2

(12) United States Patent
Harada et al.

(10) Patent No.: US 12,526,041 B2
(45) Date of Patent: Jan. 13, 2026

(54) SATELLITE COMMUNICATION SYSTEM, TRANSMISSION POWER CONTROL METHOD, TRANSMISSION POWER CONTROLLER, AND PROGRAM

(71) Applicant: NTT, Inc., Tokyo (JP)

(72) Inventors: Koichi Harada, Musashino (JP); Fumihiro Yamashita, Musashino (JP); Hiroki Shibayama, Musashino (JP)

(73) Assignee: NTT, Inc., Tokyo (JP)

( * ) Notice: Subject to any disclaimer, the term of this patent is extended or adjusted under 35 U.S.C. 154(b) by 288 days.

(21) Appl. No.: 18/278,415

(22) PCT Filed: Mar. 9, 2021

(86) PCT No.: PCT/JP2021/009352
§ 371 (c)(1),
(2) Date: Aug. 23, 2023

(87) PCT Pub. No.: WO2022/190218
PCT Pub. Date: Sep. 15, 2022

(65) Prior Publication Data
US 2024/0137114 A1   Apr. 25, 2024
US 2024/0235663 A9   Jul. 11, 2024

(51) Int. Cl.
*H04B 7/185* (2006.01)
*H04W 84/06* (2009.01)

(52) U.S. Cl.
CPC ....... *H04B 7/18543* (2013.01); *H04B 7/1855* (2013.01); *H04W 84/06* (2013.01)

(58) Field of Classification Search
CPC ............ H04B 7/18513; H04B 7/18543; H04B 7/1855; H04W 52/04; H04W 52/18; H04W 52/22; H04W 84/06
See application file for complete search history.

(56) References Cited

U.S. PATENT DOCUMENTS

| | | | |
|---|---|---|---|
| 6,842,624 B2* | 1/2005 | Sarkar | H04W 52/325 |
| | | | 455/67.11 |
| 7,072,619 B2* | 7/2006 | Unno | H04W 52/267 |
| | | | 455/127.1 |

(Continued)

OTHER PUBLICATIONS

Matsui et al., "Wireless signal processing equipment that achieves high maintainability and availability in remote island satellite communication systems and disaster countermeasure satellite communication systems", NTT Technical Journal, Mar. 2020, pp. 46-49 (8 pages including English Translation).

(Continued)

*Primary Examiner* — Alpus Hsu
(74) *Attorney, Agent, or Firm* — XSENSUS LLP

(57) ABSTRACT

A transmission power controller includes: a control unit that outputs, within a range not exceeding a transmission power control (TPC) set point, a TPC controlled variable that increases transmission power of a transmission system device more in a case of a larger attenuation of a reception signal received from a communication satellite; a data accumulation unit that accumulates the TPC controlled variable; an appropriate value extraction unit that extracts, as a TPC appropriate set point, the largest TPC controlled variable among the accumulated TPC controlled variables except a top predetermined proportion; and an updating unit that outputs, to the transmission system device, a reference transmission power increase signal that increases the reference transmission power more in a case of a larger difference between the TPC set point and the TPC appropriate set point and updates the TPC set point with the TPC appropriate set point. Thereby, efficient use of a transmitter is enabled.

7 Claims, 12 Drawing Sheets

(56) References Cited

U.S. PATENT DOCUMENTS

| | | | | |
|---|---|---|---|---|
| 7,277,721 | B2* | 10/2007 | Okumura | H04W 52/50 |
| | | | | 455/67.11 |
| 7,493,134 | B2* | 2/2009 | Shinozaki | H04W 52/12 |
| | | | | 455/69 |
| 8,369,883 | B2* | 2/2013 | Kuroda | H04W 52/241 |
| | | | | 370/321 |
| 9,565,641 | B2* | 2/2017 | Ouchi | H04W 52/50 |
| 2005/0239467 | A1* | 10/2005 | Nishio | H04W 52/40 |
| | | | | 455/442 |
| 2008/0081655 | A1* | 4/2008 | Shin | H04W 52/242 |
| | | | | 455/522 |
| 2011/0319121 | A1* | 12/2011 | Jen | H04W 52/367 |
| | | | | 455/522 |
| 2014/0045544 | A1* | 2/2014 | Ohyama | H04W 52/228 |
| | | | | 455/522 |
| 2021/0099958 | A1* | 4/2021 | Bae | H04W 52/146 |

OTHER PUBLICATIONS

Japan Radio Co. Ltd., "Satellite Communication System Fixed Satellite Communication System", Available Online at: http://www.jrc.co.jp/jp/product/lineup/satellite_network_system/index.html, Retrieved from the net on: Dec. 11, 2020, pp. 1-3 (6 pages including English Translation).

* cited by examiner

Fig. 7

| TPC CONTROLLED VARIABLE | 0dB | 1dB | 2dB | 3dB | 4dB | 5dB | 6dB | 7dB | 8dB | 9dB | SUM TOTAL |
|---|---|---|---|---|---|---|---|---|---|---|---|
| 2019.6 | 130,000 | 120 | 20 | 10 | 2 | 0 | 0 | 0 | 0 | 0 | 130,152 |
| 2019.7 | 120,000 | 10,000 | 30 | 15 | 10 | 10 | 1 | 1 | 1 | 0 | 130,068 |
| 2019.8 | 58,000 | 72,000 | 160 | 45 | 25 | 20 | 15 | 15 | 4 | 3 | 130,287 |
| 2019.9 | 54,000 | 68,000 | 90 | 50 | 25 | 10 | 15 | 5 | 5 | 2 | 122,202 |
| 2019.10 | 28,000 | 99,000 | 460 | 200 | 130 | 60 | 50 | 30 | 15 | 10 | 127,955 |
| 2019.11 | 2,200 | 127,000 | 2 | 0 | 0 | 0 | 0 | 0 | 0 | 0 | 129,202 |
| SUM TOTAL | 392,200 | 376,120 | 762 | 320 | 192 | 100 | 81 | 51 | 25 | 15 | 769,866 |
| PROBABILITY | 50.944% | 48.855% | 0.099% | 0.042% | 0.025% | 0.013% | 0.011% | 0.007% | 0.003% | 0.002% | |
| CUMULATIVE PROBABILITY | 100.000% | 49.056% | 0.201% | 0.102% | 0.060% | 0.035% | 0.022% | 0.012% | 0.005% | 0.002% | |

SATELLITE COMMUNICATION SYSTEM, TRANSMISSION POWER CONTROL METHOD, TRANSMISSION POWER CONTROLLER, AND PROGRAM

CROSS-REFERENCE TO RELATED APPLICATION

The present application is based on PCT filing PCT/JP2021/009352, filed Mar. 9, 2021, the entire contents of which are incorporated herein by reference.

TECHNICAL FIELD

The present invention relates to a satellite communication system, a transmission power control method, a transmission power controller, and a program.

BACKGROUND ART

A base station (a master station, or a hub station) in a star satellite communication system needs to be stably operated in order to communicate with a plurality of terminal stations (slave stations, or very small aperture terminals (VSATs)). To this end, the base station has a transmission power control (TPC) function that corrects a satellite reception level due to rainfall attenuation to make the satellite arrival level constant.

For example, Non Patent Literature 1 and Non Patent Literature 2 disclose a satellite communication system in which a base station is equipped with a transmission power control function. The transmission power control function increases the transmission output by an amount corresponding to an attenuation due to rainfall or the like and transmits a signal. In the transmission power control function, a TPC set point is set as the maximum value of the range in which control is possible, and a conventional TPC set point is set as a fixed value.

CITATION LIST

Non Patent Literature

Non Patent Literature 1: Matsui et al., "Ritō Eisei Tsūshin Shisutemu oyobi Saigai Taisaku Eisei Tsūshin Shisutemu ni-oite, Takai Hoshusei to Kayōsei wo Jitsugen-suru Musen Shingo Shori Sōchi" (in Japanese), NTT Gijutsu Jānaru, pp 46-49, March 2020

Non Patent Literature 2: Japan Radio Co., Ltd., "Eisei Tsūshin Shisutemu, Kotei-gata Eisei Tsūshin Shisutemu" (in Japanese), [searched on Feb. 8, 2021], website: <URL: http://www.jrc.co.jp/jp/product/lineup/satellite-_network_system/index.html>

SUMMARY OF INVENTION

Technical Problem

In a conventional satellite communication system, after a TPC set point is set and the operation is started, whether the set TPC set point is an appropriate value or not is not checked, analyzed, or decided. If the largest controlled variable of TPC (the TPC set point) is set larger for rainfall attenuation compensation in the transmission capacity of the transmitter, the power that can be outputted in fine weather (a reference transmission power) needs to be set smaller accordingly.

Therefore, if the TPC set point is set to a value more than necessary, the power that can be outputted in fine weather (the reference transmission power) is in a state of being limited more than necessary; consequently, effective use as a transmitter may not be achieved.

The present invention has been made to solve the problem described above, and an object of the present invention is to provide a satellite communication system, a transmission power control method, a transmission power controller, and a program that enables efficient use of a transmitter by setting an appropriate TPC set point.

Solution to Problem

A first aspect relates to a satellite communication system including: a communication satellite; and a satellite communication earth station that transmits and receives signals to and from the communication satellite.

The satellite communication earth station includes:
 a transmission power controller that outputs a controlled variable of transmission power control that makes constant a level of a transmission signal arriving at the communication satellite (hereinafter, a TPC controlled variable); and
 a transmission system device that outputs the transmission signal with a transmission power obtained by adding a power according to the TPC controlled variable to a reference transmission power.

The transmission power controller includes:
 a control unit that, for each of control cycles, outputs, to the transmission system device, the TPC controlled variable that increases the transmission power more in a case of a larger attenuation of a reception signal received from the communication satellite, the TPC controlled variable being equal to or less than a TPC set point;
 a data accumulation unit that accumulates the TPC controlled variable for each of the control cycles;
 an appropriate value extraction unit that extracts, as a TPC appropriate set point, the largest TPC controlled variable among the accumulated TPC controlled variables except a top predetermined proportion; and
 an updating unit that outputs, to the transmission system device, a reference transmission power increase signal that increases the reference transmission power more in a case of a larger difference between the TPC set point and the TPC appropriate set point and updates the TPC set point with the TPC appropriate set point.

A second aspect relates to a transmission power control method for making constant a level of a transmission signal arriving at a communication satellite.

The transmission power control method includes:
 a control step of, for each of control cycles, outputting, to a transmission system device, a controlled variable of transmission power control that increases transmission power more in a case of a larger attenuation of a reception signal received from the communication satellite (hereinafter, a TPC controlled variable), the TPC controlled variable being equal to or less than a TPC set point, and the transmission system device being configured to output the transmission signal with the transmission power obtained by adding a power according to the TPC controlled variable to a reference transmission power;
 a data accumulation step of accumulating the TPC controlled variable for each of the control cycles;

an appropriate value extraction step of extracting, as a TPC appropriate set point, the largest TPC controlled variable among the accumulated TPC controlled variables except a top predetermined proportion; and an updating step of outputting, to the transmission system device, a reference transmission power increase signal that increases the reference transmission power more in a case of a larger difference between the TPC set point and the TPC appropriate set point and updating the TPC set point with the TPC appropriate set point.

A third aspect relates to a transmission power controller for making constant a level of a transmission signal arriving at a communication satellite.

The transmission power controller includes:

a control unit that, for each of control cycles, outputs, to a transmission system device, a controlled variable of transmission power control that increases transmission power more in a case of a larger attenuation of a reception signal received from the communication satellite (hereinafter, a TPC controlled variable), the TPC controlled variable being equal to or less than a TPC set point, and the transmission system device being configured to output the transmission signal with the transmission power obtained by adding a power according to the TPC controlled variable to a reference transmission power;

a data accumulation unit that accumulates the TPC controlled variable for each of the control cycles;

an appropriate value extraction unit that extracts, as a TPC appropriate set point, the largest TPC controlled variable among the accumulated TPC controlled variables except a top predetermined proportion; and an updating unit that outputs, to the transmission system device, a reference transmission power increase signal that increases the reference transmission power more in a case of a larger difference between the TPC set point and the TPC appropriate set point and updates the TPC set point with the TPC appropriate set point.

A fourth aspect relates to a program that causes a computer to function as the transmission power controller described above.

Advantageous Effects of Invention

According to the present invention, an excessively set TPC set point can be appropriately reduced, and a reference transmission power of a transmission system device can be increased by an amount corresponding to the reduction of the TPC set point. Thereby, the transmission output in fine weather can be enhanced, and efficient use of a transmitter is enabled.

BRIEF DESCRIPTION OF DRAWINGS

FIG. 7 is a diagram showing an example of TPC record data outputted as a result of processing based on data output processing and data aggregation processing.

DESCRIPTION OF EMBODIMENTS

Figure 1:
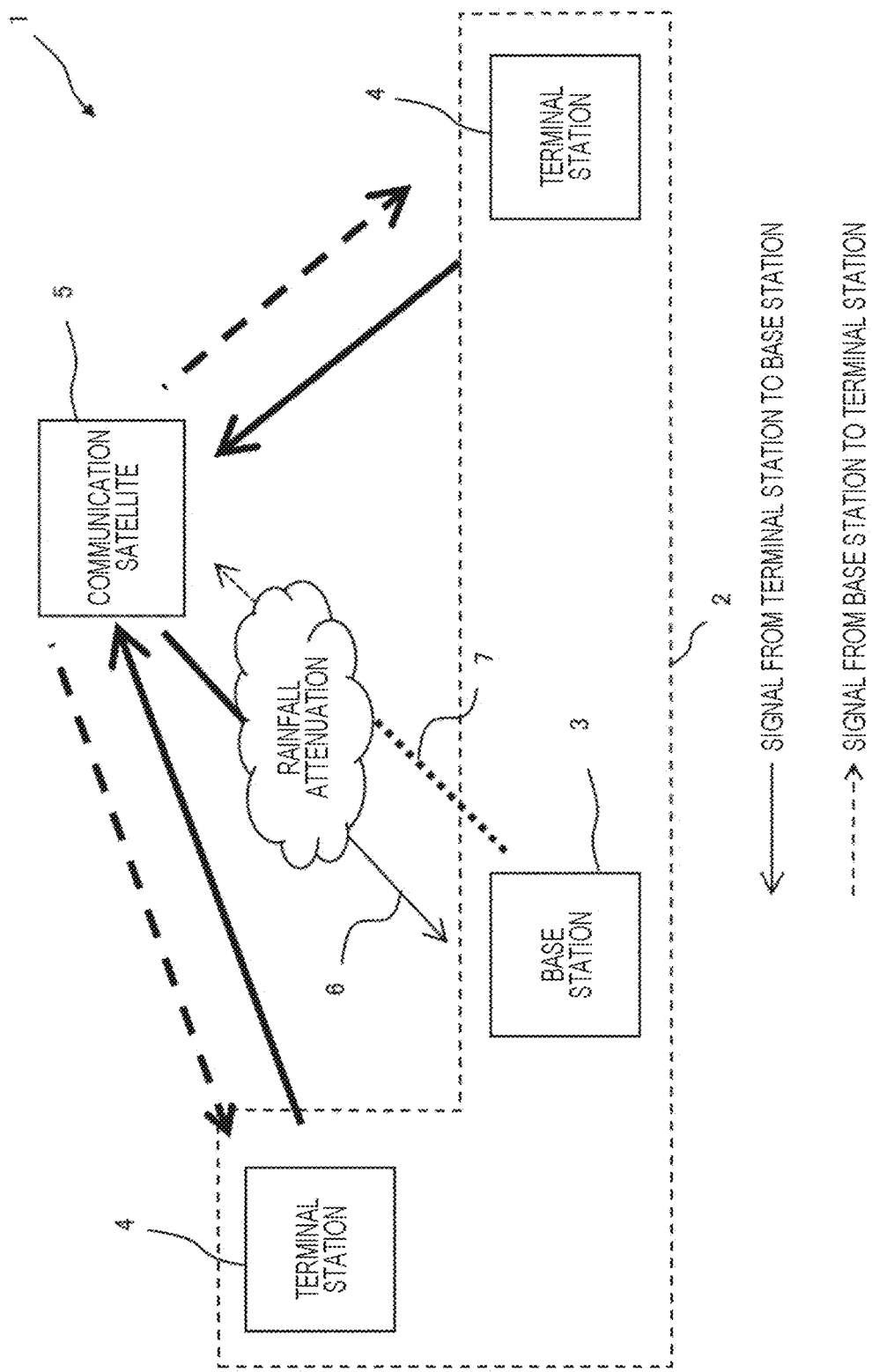
FIG. 1 is a conceptual diagram for describing an overview of a satellite communication system according to an embodiment of the present invention.

Hereinbelow, embodiments of the present invention are described in detail with reference to the drawings. However, when a numeral, such as the number, numerical quantity, quantity, or range, of each element is mentioned in the embodiments shown below, the present invention is not limited to the mentioned numeral unless explicitly stated or clearly specified to the numeral in principle. Further, the structures, etc. described in the embodiments shown below are not necessarily essential to the present invention unless explicitly stated or clearly specified to them in principle. Note that elements common to drawings are denoted by the same reference numerals, and a redundant description is omitted.

Embodiments

1. Satellite Communication System

FIG. 1 is a conceptual diagram for describing an overview of a satellite communication system according to an embodiment of the present invention. A satellite communication system 1 shown in FIG. 1 is a system in which a plurality of satellite communication earth stations 2 (base stations 3 and terminal stations 4) perform wireless communication via a communication satellite 5. The satellite communication system 1 is, for example, a star satellite communication system. In the star satellite communication system, transmission/reception signals always pass through a base station 3 (a master station) that is a hub station. The terminal station 4 (a slave station) is a VSAT. The communication satellite 5 transmits a signal received from a terminal station 4 of a transmission source to the base station 3, and transmits a signal received from the base station 3 to a terminal station 4 of a transmission destination.

In FIG. 1, the solid arrow indicates a signal from the terminal station 4 to the base station 3. The broken arrow indicates a signal from the base station 3 to the terminal station 4. As indicated by a solid arrow 6 and a broken arrow 7, the signal level may decrease due to rainfall attenuation between the communication satellite 5 and the satellite communication earth station 2.

Hence, the satellite communication earth station 2 executes transmission power control (TPC) that makes constant the level of a transmission signal arriving at the communication satellite 5. The transmission power control increases the transmitter output in accordance with the level decrease of a signal received from the communication satellite 5.

2. Satellite Communication Earth Station 2-1. Basic Processing of Transmission Power Control (TPC)

Figure 2:
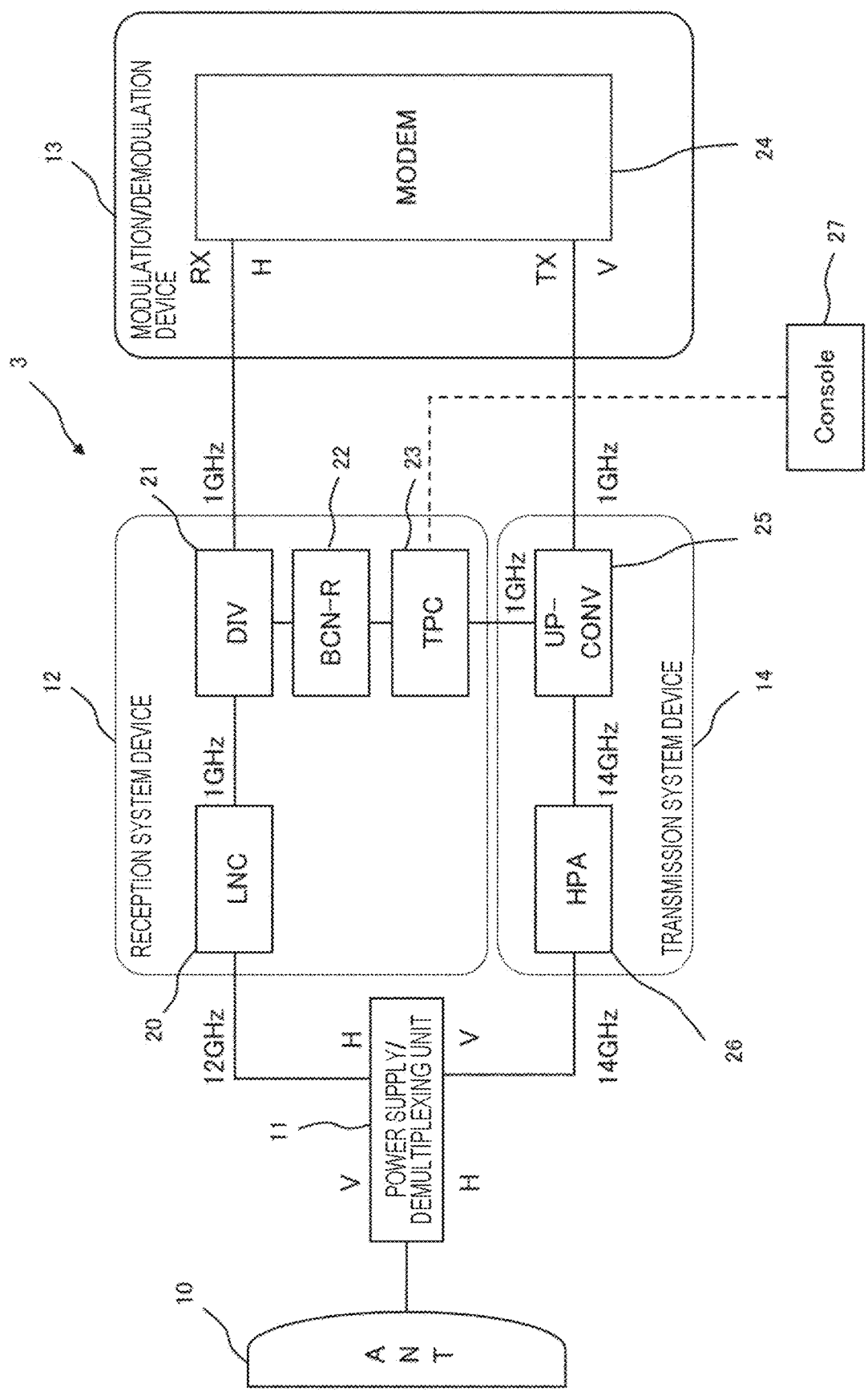
FIG. 2 is a block diagram illustrating an overview of functions of a satellite communication earth station according to an embodiment of the present invention.

Basic processing of transmission power control in the satellite communication earth station 2 that transmits and receives signals to and from the communication satellite 5 will now be described with reference to FIG. 2 and FIG. 3. FIG. 2 is a block diagram illustrating an overview of functions of the satellite communication earth station 2 according to an embodiment of the present invention.

The base station 3 includes, as devices responsible for transmission power control, an antenna 10 (ANT), a power supply/demultiplexing unit 11, a reception system device 12, a modulation/demodulation device 13, and a transmission system device 14. The reception system device 12 includes a low noise converter 20 (LNC), a divider 21 (DIV), a beacon receiver 22 (BCN-R), and a transmission power controller 23 (TPC). The modulation/demodulation device 13 includes a modem 24. The transmission system device 14 includes a transmission frequency converter 25 (an UP converter, UP-CONY) and a high power amplifier 26 (HPA).

The antenna 10 is connected to the power supply/demultiplexing unit 11. The power supply/demultiplexing unit 11 is connected to the reception system device 12. The reception system device 12 is connected to the modulation/demodulation device 13 and the transmission system device 14. The transmission system device 14 is connected to the power supply/demultiplexing unit 11.

Each of the antenna 10 and the power supply/demultiplexing unit 11 is a device of a system of both transmission and reception. The antenna 10 receives a signal in the 12 GHz band sent from the communication satellite 5, and outputs the signal to the power supply/demultiplexing unit 11. The power supply/demultiplexing unit 11 demultiplexes the signal inputted from the antenna 10, and outputs the resulting signal to the reception system device 12. In FIG. 2, the signal of the reception system is indicated by H-polarized wave.

Further, in FIG. 2, the signal of the transmission system is indicated by V-polarized wave. The power supply/demultiplexing unit 11 synthesizes signals in the 14 GHz band inputted from the transmission system device 14, and outputs the resulting signal to the antenna 10. The antenna 10 transmits the signal in the 14 GHz band inputted from the power supply/demultiplexing unit 11 toward the communication satellite 5.

The reception system device 12 divides the signal inputted from the power supply/demultiplexing unit 11. A main signal is outputted to the modulation/demodulation device 13. Further, the reception system device 12 outputs a controlled variable of transmission power control calculated on the basis of a divided beacon signal (hereinafter, a TPC controlled variable) to the transmission system device 14.

The transmission system device 14 outputs a transmission signal with a transmission power obtained by adding a power according to the TPC controlled variable to a reference transmission power. The reference transmission power corresponds to transmission power in fine weather without rainfall attenuation. The reference transmission power is set such that the transmission power obtained by adding a power according to the TPC controlled variable to the reference transmission power does not exceed the transmission capacity of the transmission system device 14.

Transmission power control processing in the reception system device 12 and the transmission system device 14 will now be described in more detail. FIG. 3 is a flowchart for describing basic transmission power control processing in the satellite communication earth station 2. The transmission power control processing is executed for each control cycle. The control cycle is, for example, several seconds to several tens of seconds. In the TPC 23, a reference value of beacon reception level and a TPC set point are set in advance. The reference value of beacon reception level is based on a beacon reception level in fine weather. The TPC set point is the maximum value of the TPC controlled variable outputted by the TPC 23.

First, in step S100, the LNC 20 of FIG. 2 frequency-converts a signal in the 12 GHz band into a signal in the 1 GHz band, and outputs the resulting signal to the DIV 21.

Next, in step S110, the DIV 21 divides the signal into two. A main signal from a satellite communication earth station 2 of a communication partner (for example, a terminal station 4) is given to the modem 24. A beacon signal from the communication satellite 5 is given to the BCN-R 22.

Next, in step S120, the BCN-R 22 measures the beacon reception level, and outputs the measured value to the TPC 23.

Next, in step S130, the TPC 23 calculates the difference between the reference value and the measured value of beacon reception level (the attenuation).

Next, in step S140, the TPC 23 calculates a transmission level value that amplifies the transmission power (a TPC controlled variable) in accordance with the attenuation in order to make constant the level of a transmission signal arriving at the communication satellite 5. The TPC controlled variable is outputted to the UP-CONY 25. The TPC controlled variable is calculated within the range from 0 to the TPC set point; for example, the TPC controlled variable is 0 in fine weather, and becomes a value closer to the TPC set point as the weather becomes worse.

Next, in step S150, the UP-CONY 25 controls the transmission power by adding a power corresponding to the TPC controlled variable to a reference transmission power, and frequency-converts a signal into the 14 GHz band and outputs the resulting signal to the HPA 26.

Next, in step S160, in order to transmit the signal in the 14 GHz band from the ANT 10 toward the communication satellite 5, the HPA 26 amplifies the transmission power and outputs the signal to the power supply/demultiplexing unit 11.

2-2. Transmission Power Controller (TPC)

If the maximum value of the TPC controlled variable (the TPC set point) is set larger for rainfall attenuation compensation in the transmission capacity of the satellite communication earth station 2, the power that can be outputted in fine weather (a reference transmission power) needs to be set smaller accordingly. Therefore, if the initially set TPC set point is set to a value more than necessary, the power that can be outputted in fine weather (the reference transmission power) is in a state of being limited more than necessary; consequently, effective use as a transmitter may not be achieved.

Thus, in the system of the present embodiment, an excessively set TPC set point is reduced to an appropriate value, and the reference transmission power is enhanced in accordance with the reduction; thereby, efficient use of a transmitter is enabled.

Characteristic processing in the TPC 23 according to the present embodiment will now be described with reference to FIG. 4 to FIG. 11.

Figure 4:
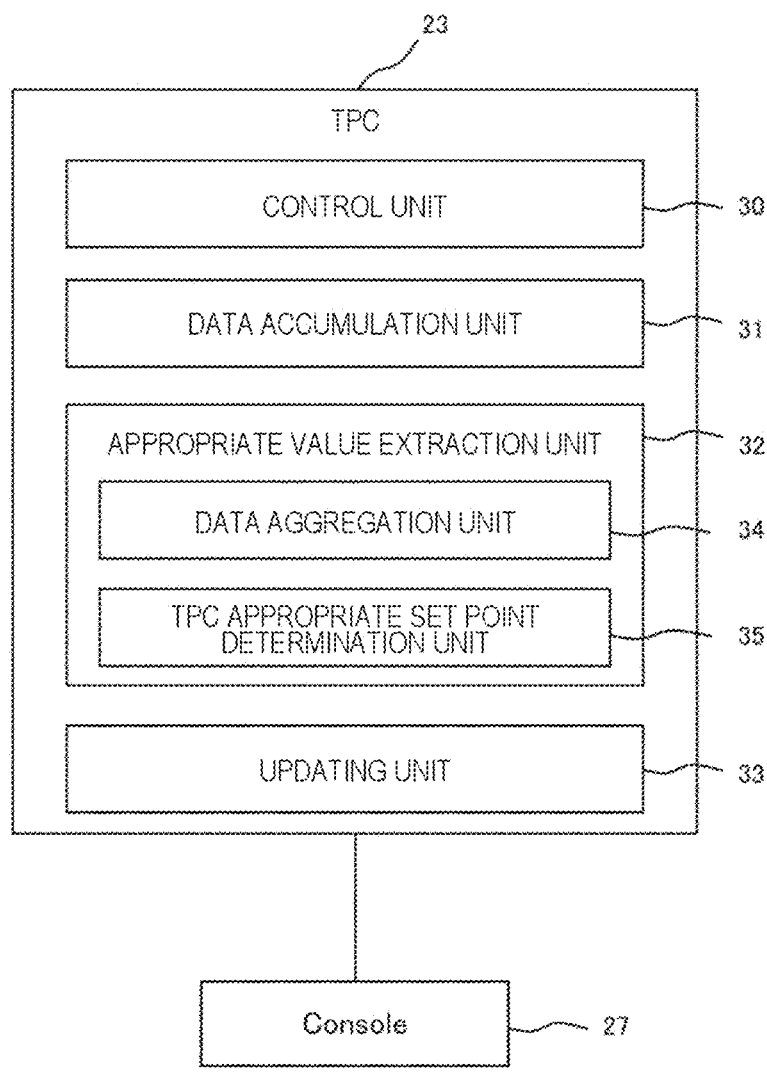
FIG. 4 is a block diagram illustrating an overview of functions of a transmission power controller according to an embodiment of the present invention.

FIG. 4 is a block diagram illustrating an overview of functions of the TPC 23 according to an embodiment of the present invention. The TPC 23 includes a control unit 30, a data accumulation unit 31, an appropriate value extraction unit 32, and an updating unit 33. A console 27 can be connected to the TPC 23.

Figure 3:
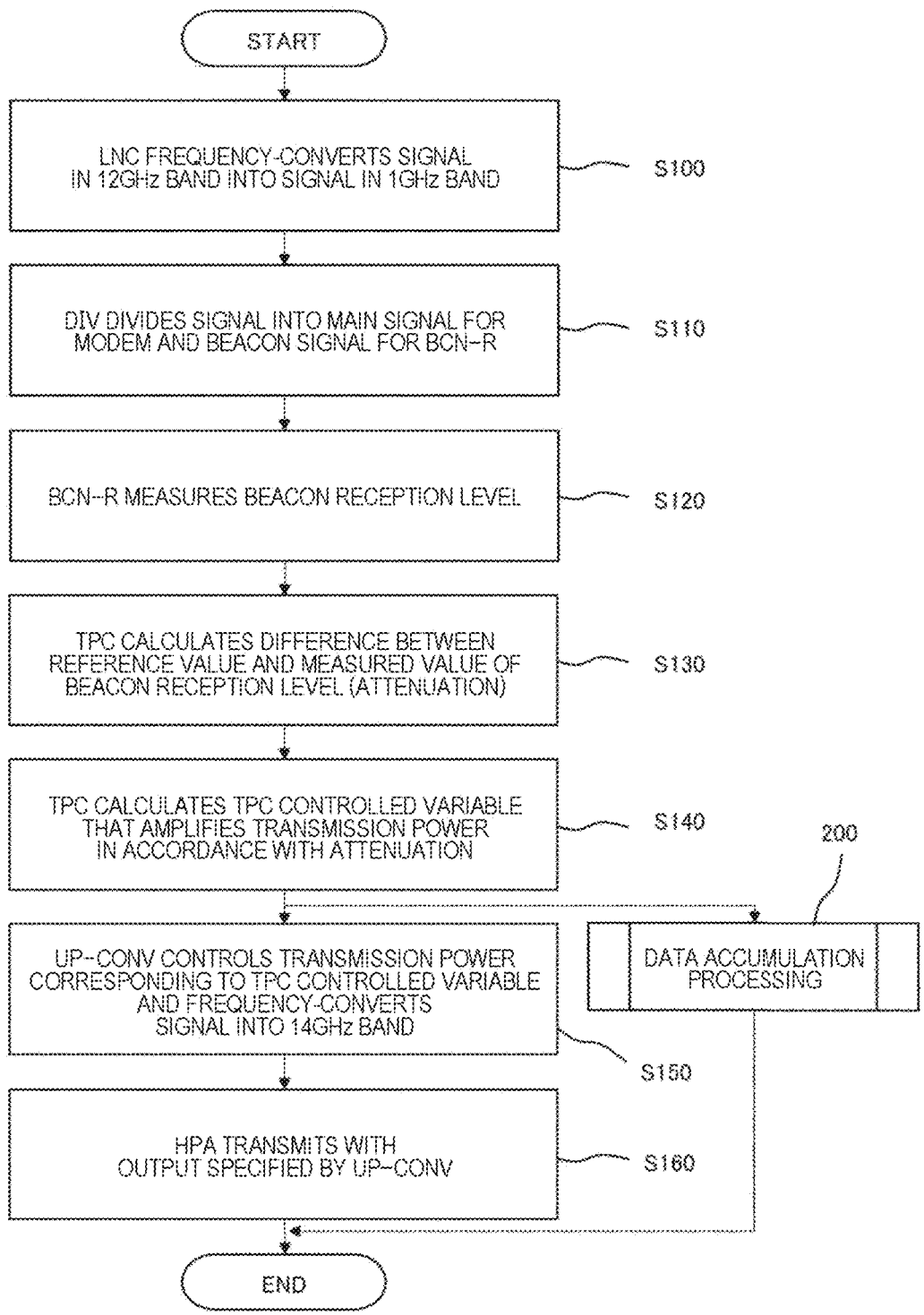
FIG. 3 is a flowchart for describing basic transmission power control processing in a satellite communication earth station.

The control unit 30 executes the processing of steps S130 and S140 of FIG. 3 described above. That is, the TPC 23 outputs, to the transmission system device 14, a TPC controlled variable that increases the transmission power more in the case of a larger attenuation of a reception signal received from the communication satellite 5. As described above, the TPC controlled variable is equal to or less than the TPC set point.

The data accumulation unit 31 executes data accumulation processing 200 (FIG. 3) after the processing of step S140 of FIG. 3 described above. The data accumulation processing 200 accumulates a TPC controlled variable calculated by the control unit 30 for each control cycle.

For example, the data accumulation unit 31 records a TPC controlled variable and a control time (date and time) for each control cycle. The control cycle (data saving interval) is set to, for example, every 20 seconds (the setting can be changed). The data accumulation unit 31 sets the TPC controlled variable to 0 [dB] for 0 to 0.5 [dB] and to 1 [dB] for 0.5 to 1.5 [dB], and then similarly classifies the TPC controlled variable in units of 1 dB and saves the data. The unit of data saving may be one that can be set.

Figure 5:
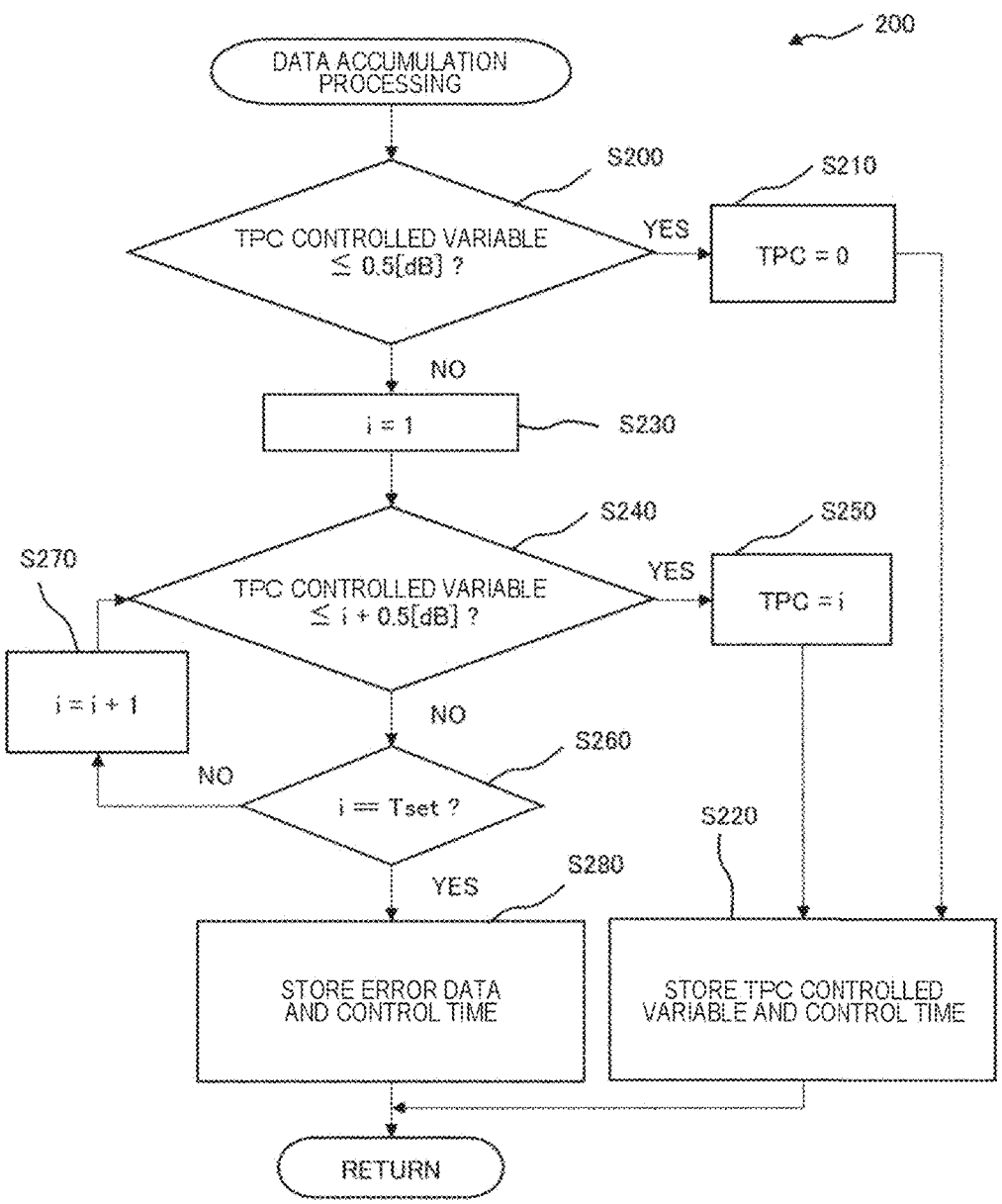
FIG. 5 is a flowchart illustrating data accumulation processing in a data accumulation unit.

FIG. 5 is a flowchart illustrating the data accumulation processing 200 in the data accumulation unit 31. Tset is a TPC set point, and is set to, for example, 9 dB. When the data saving interval is set to 20 seconds, the flow ends within 20 seconds.

First, in step S200, it is decided whether or not the TPC controlled variable calculated in step S140 of FIG. 3 is 0.5 [dB] or less. In the case where it is decided that the TPC controlled variable is 0.5 [dB] or less, the TPC controlled variable to be saved is set to 0 [dB] (step S210). After that, the TPC controlled variable and the control time (date and time) are saved (step S220), and the data accumulation processing 200 ends.

On the other hand, in the case where it is decided in step S200 that the TPC controlled variable is larger than 0.5 [dB], 1 [dB] is substituted for the variable i (step S230), and it is decided whether or not the TPC controlled variable is i+0.5 [dB] or less (step S240). In the case where it is decided that the TPC controlled variable is i+0.5 [dB] or less, the TPC controlled variable to be saved is set to i [dB] (step S250). After that, the TPC controlled variable and the control time (date and time) are saved (step S220), and the data accumulation processing 200 ends.

On the other hand, in the case where it is decided in step S240 that the TPC controlled variable is larger than i+0.5 [dB], it is decided whether or not the variable i is the same as Tset (the TPC set point) (step S260). In the case where it is decided that the variable i is not the same as Tset, the variable i is incremented by 1 (step S270), and the processing is restarted from step S240.

On the other hand, in the case where it is decided in step S260 that the variable i is the same as Tset, error data and the control time (date and time) are saved (step S280), and the data accumulation processing 200 ends.

Thus, each time transmission power control is executed, a TPC controlled variable and a control time are recorded in the data accumulation unit 31.

Figure 6:
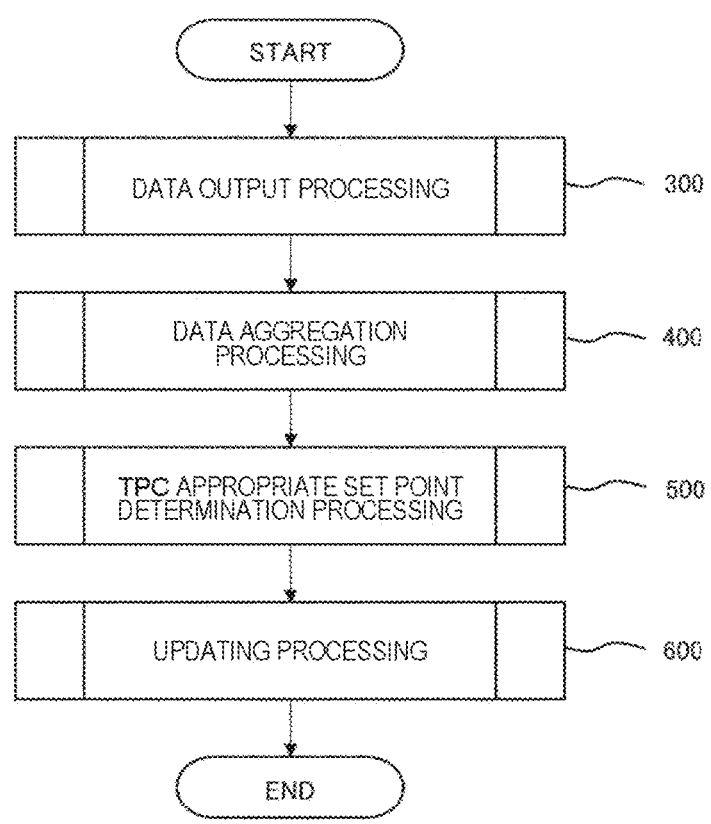
FIG. 6 is a flowchart for describing an overview of processing in an appropriate value extraction unit and an updating unit.

FIG. 6 is a flowchart for describing an overview of processing executed on the basis of a large number of TPC controlled variables accumulated by the data accumulation unit 31. Data output processing 300, data aggregation processing 400, TPC appropriate set point determination processing 500, and updating processing 600 shown in FIG. 6 are each independent processing, and are each executed when the operator inputs an execution command of the processing by using the console 27.

FIG. 7 is a diagram showing an example of TPC record data outputted as a result of processing based on the data output processing 300 and the data aggregation processing 400. Herein, the TPC set point at the time of accumulation in the data accumulation unit 31 is assumed to be 9 [dB]. The period specified at the time of data output is assumed to be June 2019 to November 2019.

The probability is expressed by the sum total of the vertical sections of each TPC controlled variable/the sum total of all the sections×100 [%]. For example, the probability that the TPC controlled variable is 9 [dB] is 15/769,866×100=0.002 [%].

The cumulative probability is a probability accumulated in descending order of the TPC controlled variable. For example, the cumulative probability of the TPC controlled variables of 9 [dB] to 7 [dB] is 0.002+0.003+0.007=0.012 [%].

The appropriate value extraction unit 32 extracts, as a TPC appropriate set point, the largest TPC controlled variable except a top predetermined proportion among the TPC controlled variables accumulated in the data accumulation unit 31. For example, the threshold of the cumulative probability is specified as 0.02 [%]. It can be decided that TPC controlled variables equal to or more than the threshold are hardly used. An appropriate TPC set point is 6 [dB], to which a TPC controlled variable not exceeding the threshold of the cumulative probability of 0.02 [%] belong. Thus, an excessively set TPC set point can be recognized.

As a result of the data output processing 300 and the data aggregation processing 400, the console 27 outputs, as shown as an example in FIG. 7, TPC controlled variables, control times, control probabilities, and cumulative control probabilities within a specified period in a form of a list. Note that the console 27 can make an output in which, for example, the TPC controlled variable being a predetermined value or more is used as a search key, in addition to an output in which the date and time shown as an example in FIG. 7 are used as a search key.

Figure 8:
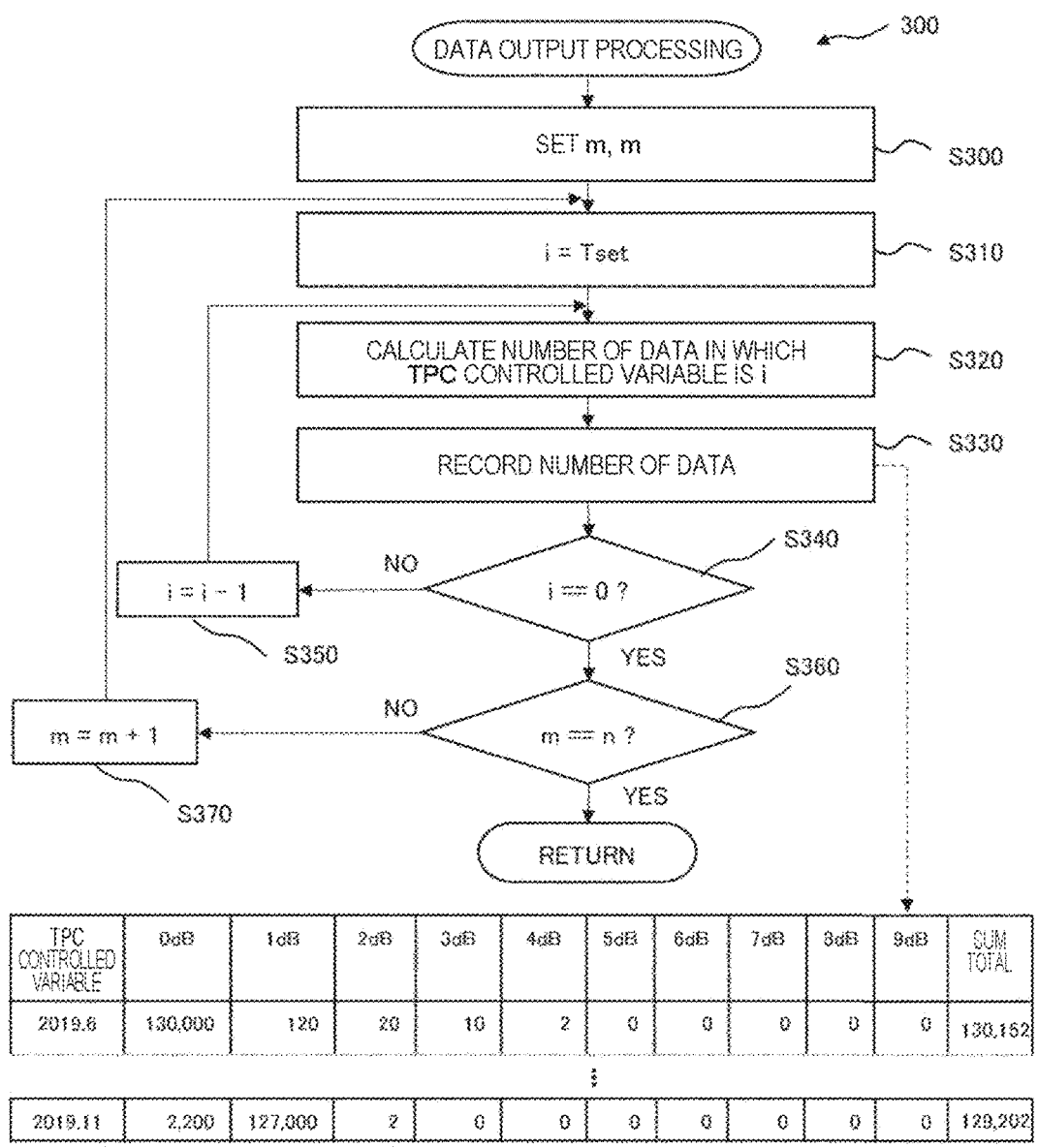
FIG. 8 is a flowchart illustrating data output processing in a data aggregation unit.

The data output processing 300 (FIG. 6) will now be described with reference to FIG. 8. FIG. 8 is a flowchart illustrating the data output processing 300. The data output processing 300 is executed when the operator issues an execution command by using the console 27. The data output processing 300 is executed by a data aggregation unit 34 (FIG. 4) of the appropriate value extraction unit 32. As an example of the initial setting information, the TPC set point at the time of accumulation in the data accumulation unit 31 is assumed to be 9 [dB]. The period specified at the time of data output is assumed to be June 2019 to November 2019. Tset is a TPC set point, and is set to 9 [dB]. The initial setting information is inputted with the console 27.

In step S300, the year and month of output starting specified with the console 27 are substituted for the variable m. The year and month of output starting are, for example, June 2019 (FIG. 7). The year and month of output ending specified with the console 27 are substituted for the variable n. The year and month of output ending are, for example, November 2019 (FIG. 7).

Next, in step S310, Tset (the TPC set point) is substituted for the variable i. In the example of FIG. 8, Tset is 9 [dB].

Next, in step S320, the number of data in which the TPC controlled variable is i [dB] is calculated.

In step S330, the number of data is recorded.

In step S340, it is decided whether or not the variable i is 0 [dB]. In the case where it is decided that the variable i is not 0, the variable i is decremented by 1 (step S350), and the processing is restarted from step S320.

On the other hand, in the case where it is decided in step S340 that the variable i is 0, the recording of the number of data of each TPC controlled variable ends for the variable m (the specified year and month).

Next, in step S360, it is decided whether or not the variable m is the same as the variable n (the year and month of output ending). In the case where it is decided that the variable m is not the same as the variable n, the variable m is incremented by one month (step S370), and the processing is restarted from step S310.

On the other hand, in the case where it is decided in step S360 that the variable m is the same as the variable n, the calculation of the number of data is completed for all the data from the year and month of output starting to the year and month of output ending. After that, the data output processing 300 ends, and the data aggregation processing 400 (FIG. 6) starts.

Figure 9:
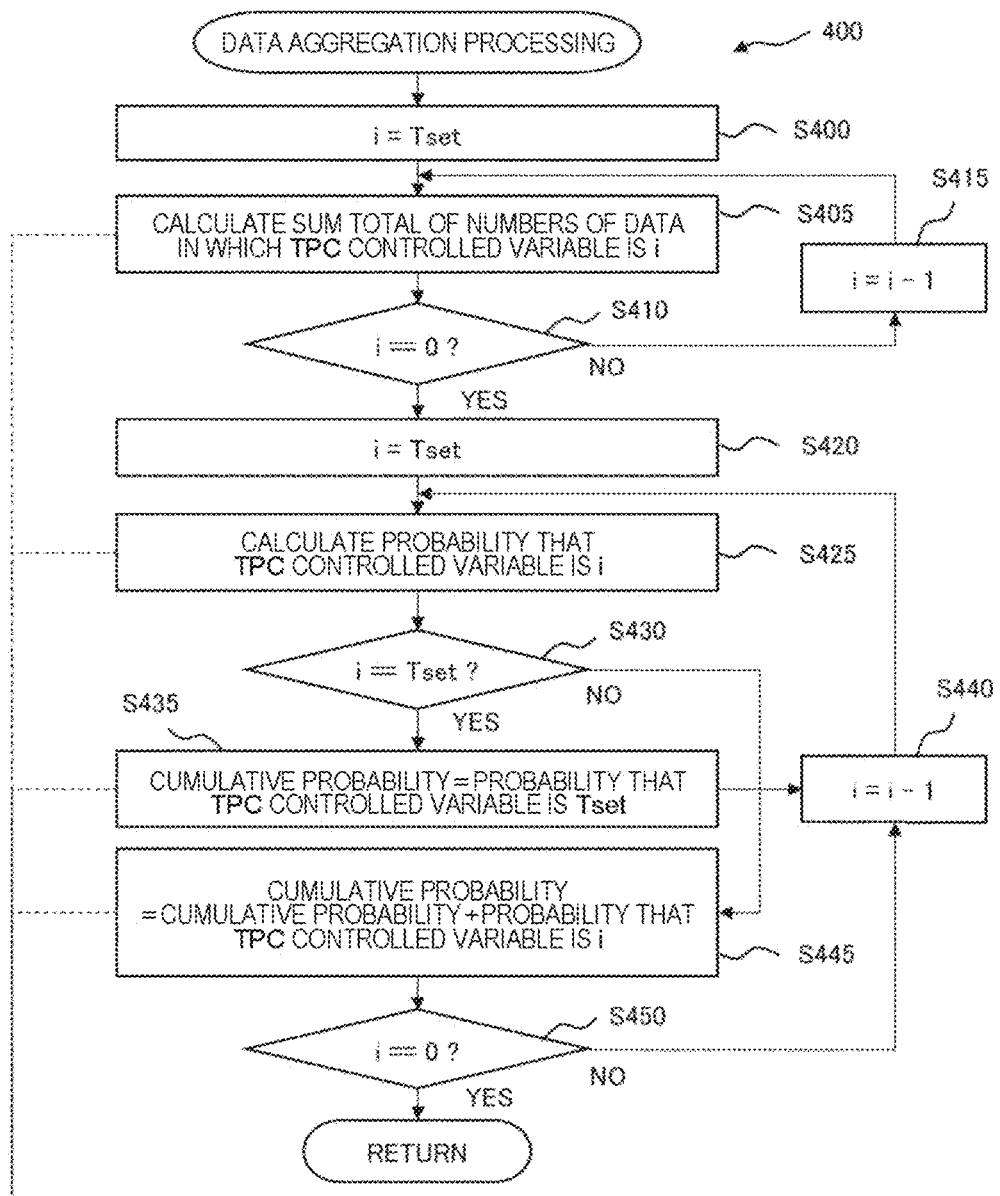
FIG. 9 is a flowchart illustrating data aggregation processing in the data aggregation unit.

The data aggregation processing 400 (FIG. 6) will now be described with reference to FIG. 9. FIG. 9 is a flowchart illustrating the data aggregation processing 400. The data aggregation processing 400 is executed when the operator issues an execution command by using the console 27. The data aggregation processing 400 is executed by the data aggregation unit 34 (FIG. 4) of the appropriate value extraction unit 32 after the data output processing 300 is ended. As an example of the initial setting information, the TPC set point at the time of accumulation in the data accumulation unit 31 is assumed to be 9 [dB]. Tset is a TPC set point, and is set to 9 dB. The initial setting information is inputted with the console 27.

First, in step S400, Tset (a TPC set point) is substituted for the variable i. In the example of FIG. 9, Tset is 9 [dB].

Next, in step S405, the sum total of the numbers of data in which the TPC controlled variable is i [dB] is calculated. For example, the sum total of the numbers of data in which the TPC controlled variable is 9 [dB] from June 2019 to November 2019 is 15.

In step S410, it is decided whether or not the variable i is 0. In the case where it is decided that the variable i is not 0, the variable i is decremented by 1 (step S415), and the processing is restarted from step S405.

On the other hand, in the case where it is decided in step S410 that the variable i is 0, the calculation of the sum total sections of FIG. 9 is completed for the TPC controlled variables of 0 to the TPC set point.

Next, in steps S420 to S450, the probability and the cumulative probability are calculated.

First, in step S420, Tset (a TPC set point) is substituted for the variable i. In the example of FIG. 9, Tset is 9 [dB].

In step S425, the probability that the TPC controlled variable is i is calculated. For example, the probability that the TPC controlled variable is 9 [dB] is 15/769,866× 100=0.002 [%].

In step S430, it is decided whether or not the variable i is the same as Tset (the TPC set point). In the case where it is decided that the variable i is the same as Tset, the probability that the TPC controlled variable is Tset [dB] is set as the cumulative probability (step S435). In the example of FIG. 9, the cumulative probability set in step S435 is 0.002 [%].

After that, the variable i is decremented by 1 (step S440), and the processing is restarted from step S425.

On the other hand, in the case where it is decided in step S430 that the variable i is different from Tset, the probability that the TPC controlled variable is i [dB] is added to the cumulative probability to obtain a new cumulative probability. For example, the cumulative probability at i=7 [dB] is calculated as 0.012 [%] by adding the probability that the TPC controlled variable is 7 [dB], 0.007 [%], to the cumulative probability of up to i=6 [dB], 0.005 [%].

In step S450, it is decided whether or not the variable i is 0. In the case where it is decided that the variable i is not 0, the variable i is decremented by 1 (step S440), and the processing is restarted from step S425. On the other hand, in the case where it is decided that the variable i is 0, the calculation of the probability and the cumulative probability is completed for all the data. After that, the data aggregation processing 400 ends, and the TPC appropriate set point determination processing 500 (FIG. 6) starts.

The TPC record data of FIG. 7 is completed as a result of the processing of the data output processing 300 and the data aggregation processing 400 described above.

Figure 10:
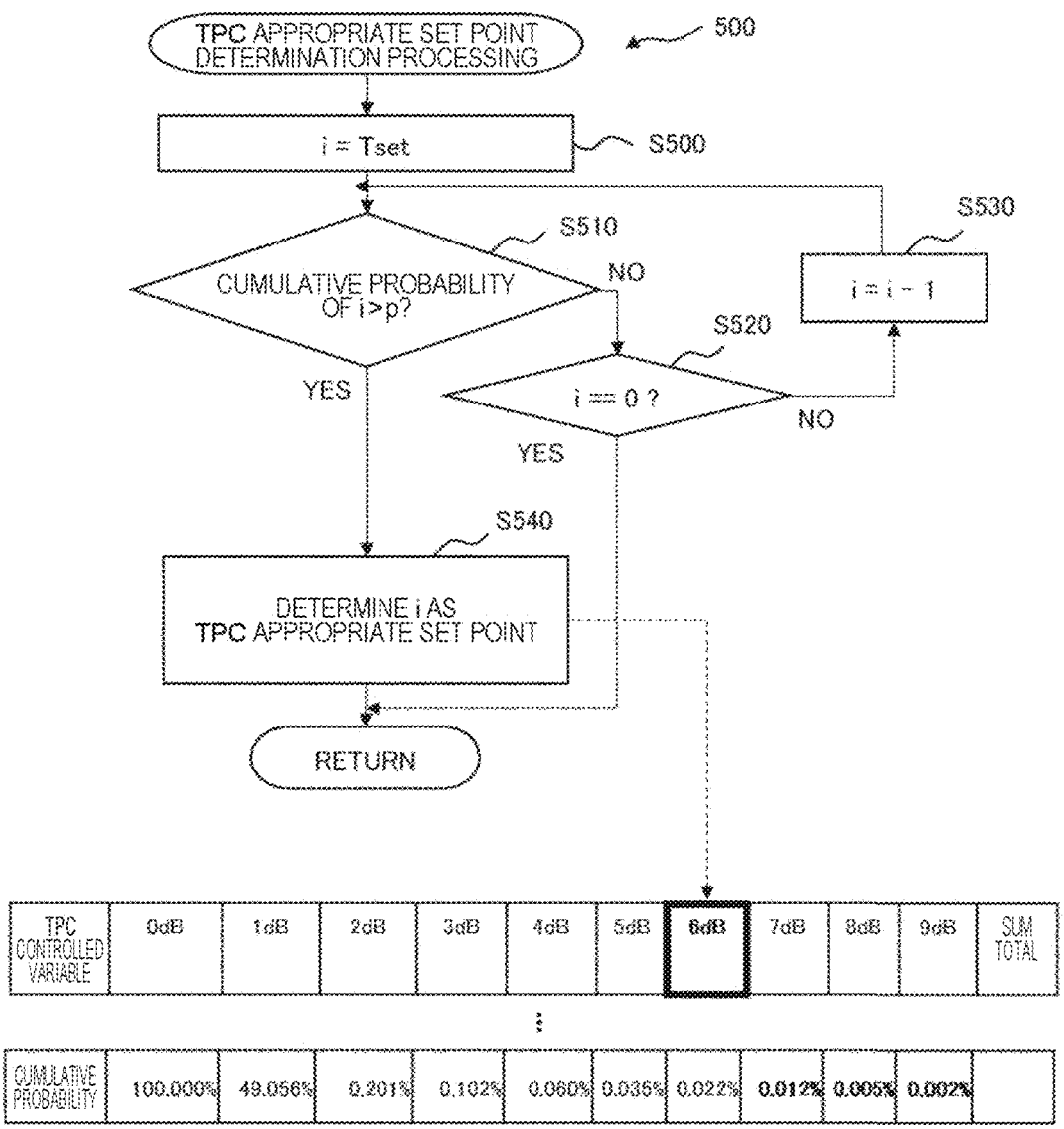
FIG. 10 is a flowchart illustrating processing in a TPC appropriate set point determination unit.

The TPC appropriate set point determination processing 500 (FIG. 6) will now be described with reference to FIG. 10. FIG. 10 is a flowchart illustrating the TPC appropriate set point determination processing 500. The TPC appropriate set point determination processing 500 is executed when the operator issues an execution command by using the console 27. The TPC appropriate set point determination processing 500 is executed by a TPC appropriate set point determination unit 35 (FIG. 4) of the appropriate value extraction unit 32 after the data aggregation processing 400 is ended. As an example of the initial setting information, Tset is a TPC set point, and is set to 9 dB. The threshold p of the cumulative probability is set to 0.02 [%]. The threshold p can be arbitrarily set, and may also be, for example, 0.1% or 1%. The initial setting information is inputted with the console 27.

First, in step S500, Tset (a TPC set point) is substituted for the variable i. In the example of FIG. 10, Tset is 9 [dB].

Next, in step S510, it is decided whether or not the cumulative probability corresponding to the TPC controlled variable of i [dB] is larger than the threshold p. In the case where it is decided that the cumulative probability is equal to or less than the threshold p, it is decided whether or not the variable i is 0 (step S520). In the case where it is decided that the variable i is not 0, the variable i is decremented by 1 (step S530), and the processing is restarted from step S510. In the case where it is decided in step S520 that the variable i is 0, the TPC appropriate set point determination processing 500 ends abnormally.

On the other hand, in the case where it is decided in step S510 that the cumulative probability is larger than the threshold p, the TPC controlled variable of i [dB] is determined as a TPC appropriate set point (step S540). In the example of FIG. 10, the cumulative probability is 0.002 [%] when the TPC controlled variable is 9 [dB], 0.005 [%] when the TPC controlled variable is 8 [dB], 0.012 [%] when the TPC controlled variable is 7 [dB], and 0.022 [%] when the TPC controlled variable is 6 [dB]. Therefore, it can be grasped and recognized that the TPC controlled variable of 6 [dB], at which the threshold of the cumulative probability of 0.02 [%] is exceeded, is a TPC appropriate set point. After that, the TPC appropriate set point determination processing 500 ends normally, and the updating processing 600 (FIG. 6) starts.

Thus, the appropriate value extraction unit 32 classifies the accumulated TPC controlled variables in accordance with magnitude, and extracts, as a TPC appropriate set point, a representative value of the classification to which the largest TPC controlled variable except a top predetermined proportion belongs.

Figure 11:
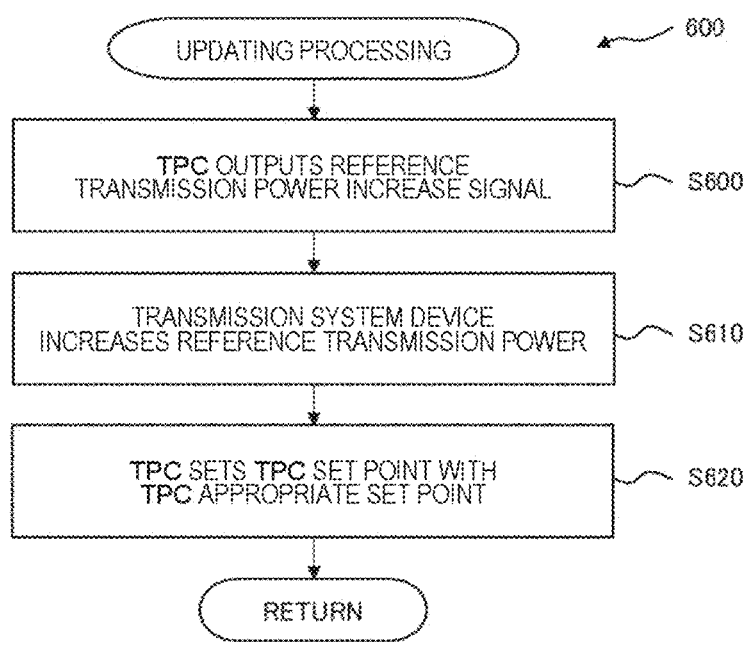
FIG. 11 is a flowchart illustrating processing in an updating unit.

The updating processing 600 (FIG. 6) will now be described with reference to FIG. 11. FIG. 11 is a flowchart illustrating the updating processing 600. The updating processing 600 is executed when the operator issues an execution command by using the console 27. The updating processing 600 is executed by the updating unit 33 (FIG. 4) after the TPC appropriate set point determination processing 500 is ended normally. Whether to update the TPC set point or not is inputted as the initial setting information from the console 27, and when a decision condition is satisfied, the processing of step S600 is started.

First, in step S600, the TPC 23 outputs, to the transmission system device 14, a reference transmission power increase signal that increases the reference transmission power more in the case of a larger difference between the TPC set point and the TPC appropriate set point. The transmission system device 14 increases the reference transmission power in accordance with the reference transmission power increase signal (step S610).

In step S620, the TPC 23 updates the TPC appropriate set point with the TPC appropriate set point. After that, the updating processing 600 ends, and the flow shown in FIG. 6 ends.

As described hereinabove, by the system of the present embodiment, the operation of TPC can be analyzed, and whether the set TPC set point is appropriate or not can be decided. Then, an excessively set TPC set point can be appropriately reduced, and the reference transmission power of the transmission system device 14 can be increased by an amount corresponding to the reduction of the TPC set point. Thereby, the transmission output in fine weather can be enhanced, and efficient use of a transmitter is enabled.

Meanwhile, in the system of the embodiment described above, the base station 3 is described as an example of the satellite communication earth station 2 including the transmission power controller 23; but the configuration described above can be applied also to the terminal station 4.

(Hardware Configuration Example)

Figure 12:
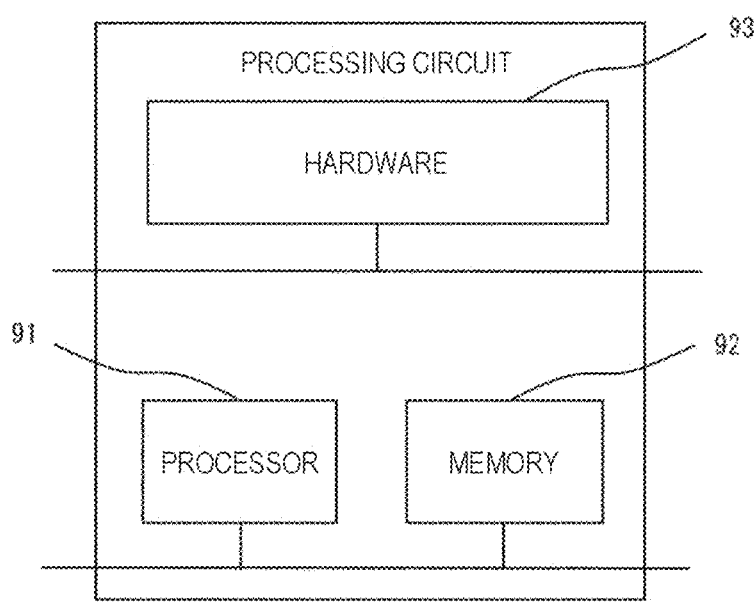
FIG. 12 is a diagram showing a hardware configuration example of a satellite communication earth station and a transmission power controller.

FIG. 12 is a conceptual diagram showing a hardware configuration example of a processing circuit included in the satellite communication earth station 2 and the TPC 23 of the embodiment described above. The functions described above are implemented by a processing circuit. As an aspect, the processing circuit includes at least one processor 91 and at least one memory 92. As another aspect, the processing circuit includes at least one piece of dedicated hardware 93.

In the case where the processing circuit includes the processor 91 and the memory 92, each function is implemented by software, firmware, or a combination of software and firmware. At least one of the software and the firmware is described as a program. At least one of the software and the firmware is stored in the memory 92. The processor 91 implements each function by reading and executing a program stored in the memory 92.

In the case where the processing circuit includes dedicated hardware 93, the processing circuit is, for example, a single circuit, a composite circuit, or a programmed processor, or a combination of these. Each function is implemented by the processing circuit.

Part or the entirety of the functions of the satellite communication earth station 2 and the TPC 23 may be configured by hardware, or may be configured as a program to be executed by a processor. That is, the satellite communication earth station 2 and the TPC 23 can be obtained by using a computer and a program, and the program can be recorded on a recording medium or provided through a network.

Hereinabove, embodiments of the present invention are described; however, the present invention is not limited to the above embodiments, and various modifications can be made within a range not departing from the gist of the present invention.

REFERENCE SIGNS LIST 1 satellite communication system
2 satellite communication earth station
3 base station
4 terminal station
5 communication satellite
10 antenna
11 power supply/demultiplexing unit
12 reception system device
13 modulation/demodulation device
14 transmission system device
20 low noise frequency converter
21 divider
22 beacon receiver
23 transmission power controller
24 modem
25 transmission frequency converter
26 high power amplifier
27 console

The invention claimed is:

1. A satellite communication system comprising:
a communication satellite; and
a satellite communication earth station configured to transmit and receive signals to and from the communication satellite,
wherein the satellite communication earth station includes:
a transmission power controller configured to output a transmission power control (TPC) controlled variable, the TPC controlled variable being a controlled variable of transmission power control for making constant a level of a transmission signal arriving at the communication satellite; and
a transmission system device configured to output the transmission signal with a transmission power obtained by adding a power according to the TPC controlled variable to a reference transmission power, and
the transmission power controller includes circuitry configured to:
output for each of control cycles, to the transmission system device, the TPC controlled variable for increasing the transmission power more in a case of a larger attenuation of a reception signal received from the communication satellite, the TPC controlled variable being equal to or less than a TPC set point;
accumulate the TPC controlled variable for each of the control cycles;
extract, as a TPC appropriate set point, the largest TPC controlled variable among the accumulated TPC controlled variables except a top predetermined proportion;

output, to the transmission system device, a reference transmission power increase signal for increasing the reference transmission power more in a case of a larger difference between the TPC set point and the TPC appropriate set point; and update the TPC set point with the TPC appropriate set point.

2. The satellite communication system according to claim 1, wherein the circuitry is configured to classify the accumulated TPC controlled variables in accordance with magnitude, and extract, as the TPC appropriate set point, a representative value of a classification to which the largest TPC controlled variable except the top predetermined proportion belongs.

3. A transmission power control method for making constant a level of a transmission signal arriving at a communication satellite, the transmission power control method comprising:

outputting a transmission power control (TPC) controlled variable to a transmission system device for each of control cycles, the TPC controlled variable being a controlled variable of transmission power control for increasing transmission power more in a case of a larger attenuation of a reception signal received from the communication satellite and equal to or less than a TPC set point, and the transmission system device being configured to output the transmission signal with the transmission power obtained by adding a power according to the TPC controlled variable to a reference transmission power;

accumulating the TPC controlled variable for each of the control cycles;

extracting, as a TPC appropriate set point, the largest TPC controlled variable among the accumulated TPC controlled variables except a top predetermined proportion;

outputting, to the transmission system device, a reference transmission power increase signal for increasing the reference transmission power more in a case of a larger difference between the TPC set point and the TPC appropriate set point; and updating the TPC set point with the TPC appropriate set point.

4. The transmission power control method according to claim 3, wherein the extracting includes classifying the accumulated TPC controlled variables in accordance with magnitude, and extracting, as the TPC appropriate set point, a representative value of a classification to which the largest TPC controlled variable except the top predetermined proportion belongs.

5. A transmission power controller for making constant a level of a transmission signal arriving at a communication satellite, the transmission power controller comprising circuitry configured to:

output a transmission power control (TPC) controlled variable to a transmission system device for each of control cycles, the TPC controlled variable being a controlled variable of transmission power control for increasing transmission power more in a case of a larger attenuation of a reception signal received from the communication satellite and equal to or less than a TPC set point, and the transmission system device being configured to output the transmission signal with the transmission power obtained by adding a power according to the TPC controlled variable to a reference transmission power;

accumulate the TPC controlled variable for each of the control cycles;

extract, as a TPC appropriate set point, the largest TPC controlled variable among the accumulated TPC controlled variables except a top predetermined proportion;

output, to the transmission system device, a reference transmission power increase signal for increasing the reference transmission power more in a case of a larger difference between the TPC set point and the TPC appropriate set point; and update the TPC set point with the TPC appropriate set point.

6. The transmission power controller according to claim 5, wherein the circuitry is configured to classify the accumulated TPC controlled variables in accordance with magnitude, and extract, as the TPC appropriate set point, a representative value of a classification to which the largest TPC controlled variable except the top predetermined proportion belongs.

7. A non-transitory computer-readable recording medium recording a program to be executed by a computer to cause the computer to function as the transmission power controller according to claim 5.

* * * * *